United States Patent [19]

Frueauff, Jr.

[11] 4,047,658

[45] Sept. 13, 1977

[54] METHOD OF FORMING A PRODUCT OF TWO DIFFERENT METALS

[76] Inventor: Harry D. Frueauff, Jr., P.O. Box 2213, Tallahassee, Fla. 32304

[21] Appl. No.: 694,839

[22] Filed: June 10, 1976

[51] Int. Cl.[2] ...................... H02R 43/02; B23K 21/00

[52] U.S. Cl. ...................................... 228/115; 228/173; 29/522; 29/628

[58] Field of Search ............... 228/115, 116, 141, 173; 29/522, 628

[56] References Cited

U.S. PATENT DOCUMENTS

| | | | |
|---|---|---|---|
| 2,393,564 | 1/1946 | Poupitch | 29/522 X |
| 2,799,840 | 7/1957 | Barnes | 29/522 X |
| 3,191,276 | 6/1965 | Gwyn, Jr. | 228/115 |
| 3,949,466 | 4/1976 | O'Brien et al. | 228/115 X |

OTHER PUBLICATIONS

Giedd, Gr.; Karsch, A. F. IBM Technical Disclosure Bulletin, vol. 10, No. 7, Dec. 1967, p. 911.

*Primary Examiner*—Al Lawrence Smith
*Assistant Examiner*—K. J. Ramsey
*Attorney, Agent, or Firm*—Woodford R. Thompson, Jr.

[57] ABSTRACT

The method of forming a product, such as an electrical connector, of two different metals wherein a recess is provided in one end of a first metal member for receiving one end of a second metal member of a smaller size. The assembled metal members are placed in a closed die and high pressure is applied to the outermost end of at least one of the metal members to impart relative movement of the metal members toward each other and cause flow of the metal together at the point of juncture with displacement of one metal in the other.

8 Claims, 4 Drawing Figures

METHOD OF FORMING A PRODUCT OF TWO DIFFERENT METALS

BACKGROUND OF THE INVENTION

This invention relates to a method of forming a product, such as an electrical connector of two different metals wherein a first metal number is connected to a second metal member and more particularly to such a method in which the two metals flow together to provide displacement of one metal in the other at the point of contact whereby surface impurities are removed from the interface of the connected portions of the metal members and a metal to metal joint is provided therebetween.

As is well known in the art to which my invention relates, difficulties have been encountered in connecting components of a product, such as an electrical connector, which are formed of different metals, such as aluminum or copper. This is especially true in view of the fact that the metals tend to creep relative to each other while in use whereby the joint flexes and opens up, thus resulting in resistance and heat which brings about a failure of the electrical connection between the different metals. In joining two different metals to produce a product, such a finished electrical conductor, it is necessary to deform the metals sufficiently at their junction to remove all surface impurities possible from the interface to thus provide pure metal to metal contact, thereby providing a virtually cold-weld between the connected parts whereby the finished product has good electrical conductivity without appreciable resistance or corrosion. At the same time, the stronger metal must be deformed to flow into a pattern which makes a good mechanical joint whereby the product will withstand considerable tension.

SUMMARY OF THE INVENTION

In accordance with my invention, I overcome the above difficulties by providing a recess in one end of a first metal member for receiving one end of a second metal member of a smaller size. With the two metal members assembled within the closed die, high pressure is applied to impart relative movement of the metal members toward each other whereby the two metals flow toward each other at the point of juncture with displacement of one metal into the other.

DESCRIPTION OF THE DRAWINGS

Apparatus which may be employed to carry out my improved method is illustrated in the accompanying drawings, forming a part of this application, in which.

DETAILED DESCRIPTION

Figure 1:
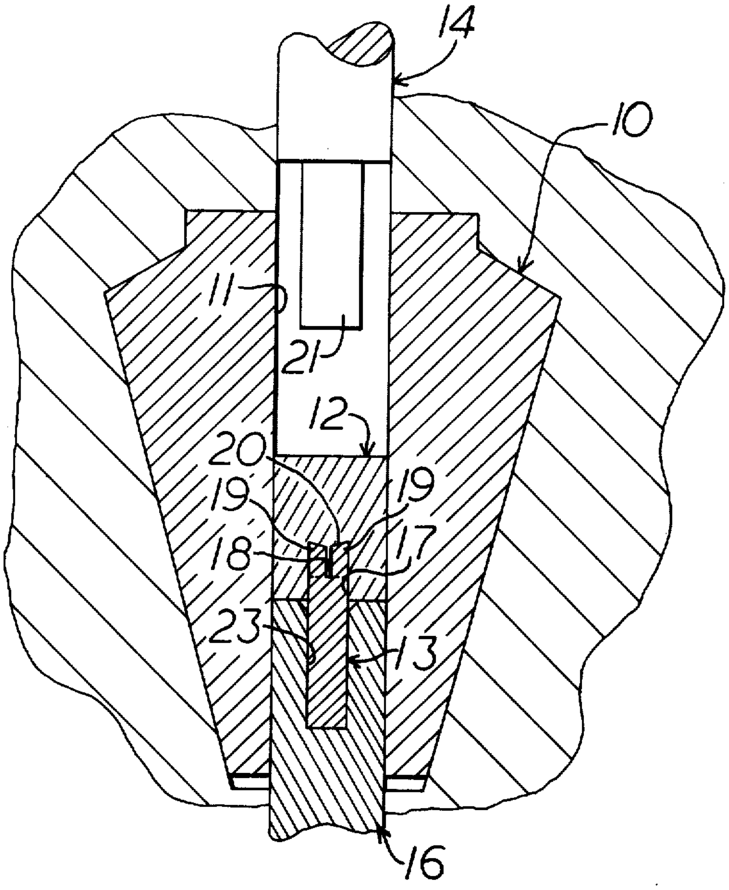
FIG. 1 is a vertical sectional view through a closed die showing two metal members therein to be formed into a finished product, with the punches in the inoperative position prior to the application of pressure.

Referring now to the drawings for a better understanding of my invention, I show a closed die generally at 10, which may be in the form of a split die for convenience of removal of the finished product or may be a solid die where small components are formed therein. The die 10 is provided with an axially extending opening 11 therethrough for receiving the metal members 12 and 13 which are to be formed into a finished product, such as an electrical connector, in a manner to be described hereinafter.

Mounted for axial movement into the upper end of the opening 11 is a male punch 14. Mounted for axial movement in the lower end of the opening 11 is a female punch 16. In view of the fact that the closed die 10 and the punches 14 and 16 are conventional forms of apparatus which might be employed to carry out my improved method, no further description thereof is deemed necessary. One such forming press is shown in my U.S. Pat. No. 2,978,932, dated Apr. b 11, 1961.

Figure 2:
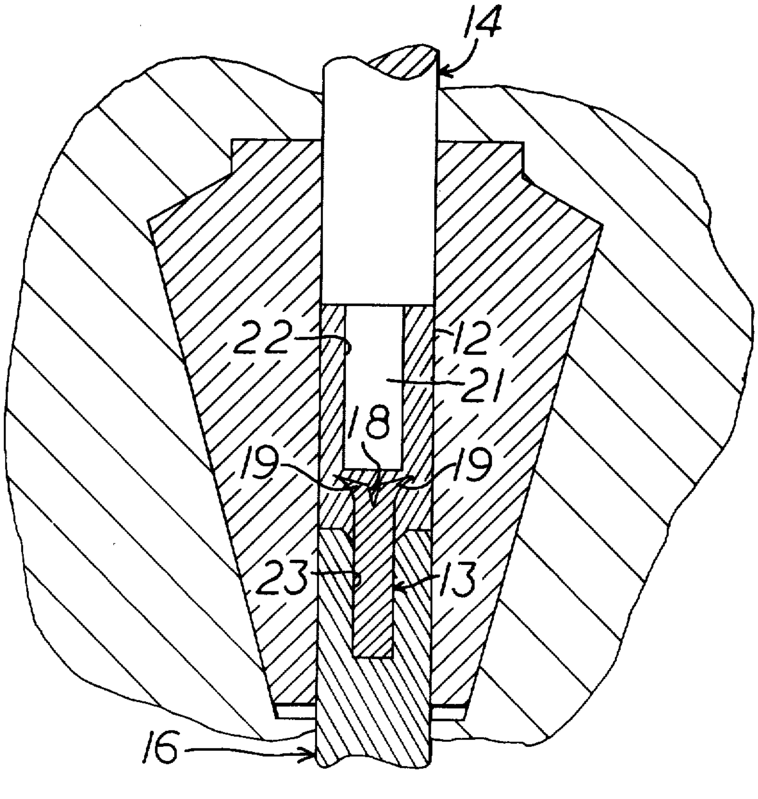
FIG. 2 is a vertical sectional view corresponding to FIG. 1 but showing the assembly after pressure has been applied to form the completed product.

In FIGS. 1 and 2 of the drawings, I show the metal member 12 as being formed of aluminum while the metal member 13 is formed of copper. A recess 17 is provided in the end of the metal member 12 adjacent the metal member 13 for receiving the adjacent end of the metal member 13, as shown in FIG. 1. The end of the metal member 13 which projects into the opening 17 is provided with transverse slits 18 therein whereby that end of the metal member 13 flares outwardly to the position shown in FIG. 2 upon the application of pressure to the outer ends of the metal members 12 and 13 by the punches 14 and 16. Preferably, two transverse slits 18 are provided with each slit extending perpendicular to the other so as to divide the adjacent end of the metal member 13 into four separate elements 19 of equal size.

As shown in FIGS. 1 and 2, the male punch 14 is provided with a reduced diameter portion 21 which is adapted to deform the adjacent metal member 12 to the shape shown in FIG. 2 to thus provide an elongated cavity 22 in the metal member 12 of a size to receive a conventional electrical connector element. The inner end of the female punch 16 is provided with an upwardly opening recess 23, as viewed in FIGS. 1 and 2 for receiving the metal member 13 whereby the metal member 13 and the metal member 12 are supported by the female punch 16 prior to application of pressure. Each punch 14 and 16 is operatively connected to pressure applying means which moves the punches 14 and 16 toward each other whereby extremely high pressures are imparted to the outermost ends of the metal members 12 and 13. Accordingly, as the oppositely disposed punches 14 and 16 are forced together under extremely high pressure, with or without heat, the metal members 12 and 13 change from the shape shown in FIG. 1 to the shape shown in FIG. 2. Since the metal members 12 and 13 are confined within the closed mold, lateral movement of the metal is limited whereby the adjacent metals 12 and 13 are caused to flow together at the point of contact of the metal members 12 and 13 with displacement of one metal in the other at the point of contact. Accordingly, the surface impurities are removed from the interface of the connected portions of the metal members and a metal to metal joint is provided therebetween.

The transverse slits 18 in the innermost end of the metal member 13 facilitate outward movement of the elements 19 from the position shown in FIG. 1 to the position shown in FIG. 2. To further aid in forcing the elements 19 outwardly, the bottom of the recess 17 in the metal member 12 is generally conical in shape, as at 20, with the central portion thereof projecting toward the open end of the recess 17, as shown in FIG. 1.

Figure 3:
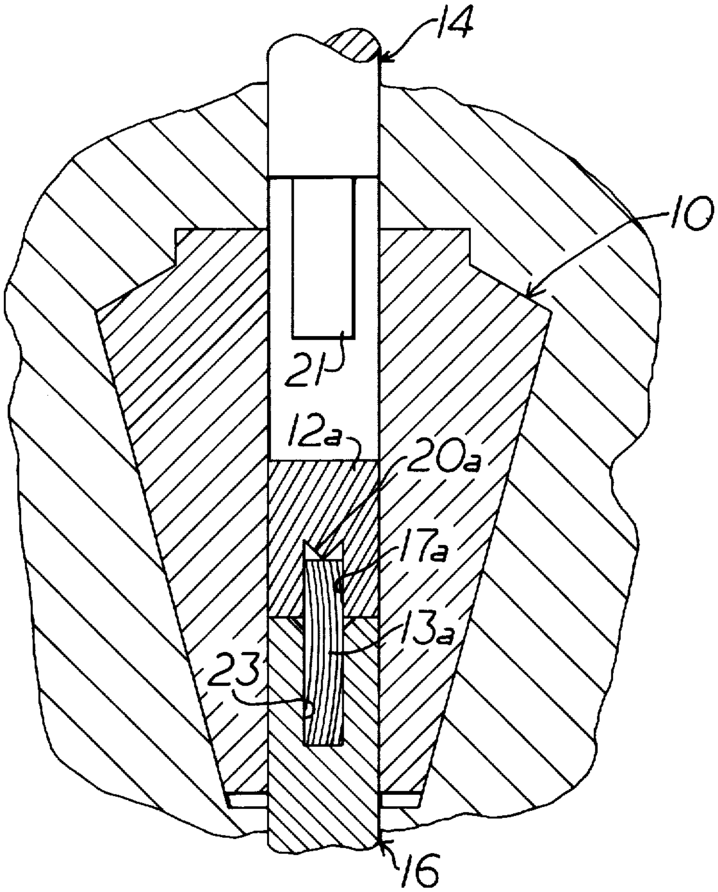
FIG. 3 is a vertical sectional view through a closed die having metal members therein to be formed into a finished product, with one metal member being in the form of stranded wire and showing the assembly prior to the application of pressure.
Figure 4:
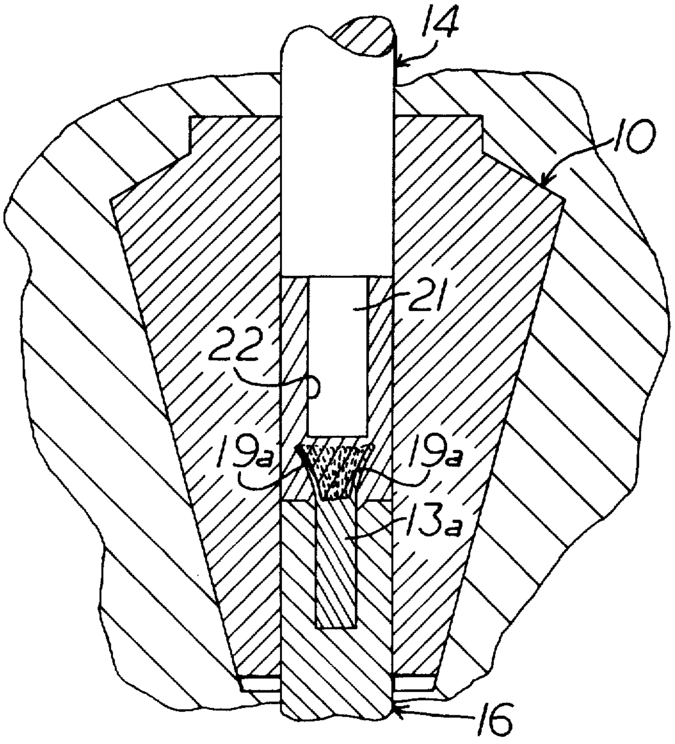
FIG. 4 is a vertical sectional view corresponding to FIG. 3 showing the assembly after pressure has been applied to form the completed product.

In FIGS. 1 and 2, the metal member 13 is shown as being in the form of a solid member, such as a wire or rod-like member. In FIGS. 3 and 4, I show a metal member 12[a], such as an aluminum member, which is provided with a recess 17[a] for receiving a stranded wire member 13[a]. The bottom of the recess 17[a] is generally conical in shape, as at 20[a], with the central portion thereof projecting toward the open end of the recess 17[a] in position to engage the inner end of the stranded wire 13[a] to thus force the individual strands 19[a] of the stranded wire 13[a] outwardly to the position shown in FIG. 4.

The metal members 12[a] and 13[a] are positioned in a closed die 10, as described hereinabove, which is provided with oppositely disposed male and female punches 14 and 16, respectively. The male punch 14 is provided with a reduced diameter portion 21 which distorts the metal member 12[a] to form an outwardly opening recess 22 therein which is adapted to receive a conventional type electrical connector in a manner well understood in the art to which my invention relates. The innermost end of the female punch 16 is provided with a recess 23 therein for receiving the stranded wire member 13[a], as shown in FIG. 3. Upon inward movement of the punches 14 and 16 toward each other, the metal members 12[a] and 13[a] are deformed whereby they change from the shape shown in FIG. 3 to the shape shown in FIG. 4. As the metal member 12[a] moves toward the adjacent end of the stranded wire member 13[a], the conical recess 20[a] engages the center of the wire strands to thus force the individual strands 19[a] at the innermost end of the stranded wire member 13[a] to the outer position shown in FIG. 4.

While the metal members 12 and 12[a] may be aluminum and the metal members 13 and 13[a] may be copper members, other metals may be employed. For example, the metal members 12 and 12[a] could be formed of wrought iron while the metal members 13 and 13[a] could be formed of either aluminum or copper.

To provide for maximum electrical conductivity of the finished connector, I plate one or both of the metal members being connected with indium or tin. Preferably, the solid copper member 13 is plated with indium while the stranded wire member 13[a] may be plated with tin.

From the foregoing, it will be seen that I have devised an improved method of forming a product, such as an electrical connector of two different metals wherein a first metal member is connected to a second metal member of a smaller size. By forcing the metal members toward each other in a closed die, the metal members are deformed at their point of juncture to remove substantially all surface impurities from the interface and thus provide for pure metal to metal contact, thus resulting in a virtually cold-weld between the connected parts. Accordingly, I provide good electrical conductivity between the connected parts without appreciable resistance or corrosion. At the time the metal members are deformed, the metals are deformed and flow into a pattern which makes a good mechanical joint whereby a good pull test results. The finished parts thus have adequate electrical conductivity and freedom from creep between the connected parts. That is, when pressure is is applied from the ends of the closed die by the formed punches, the two metals flow together to provide displacement of one metal to the other, thus resulting in an intimate metal to metal contact which provides a good electrical and mechanical joint. Furthermore, by plating one or both of the metals being connected with tin or indium, a better electrical connection is provided between the metal members thus connected.

It will be apparent that the shapes of the outer and inner portions of my improved product may be round, as shown, or of any other desired shape.

While I have shown my invention in but two forms, it will be obvious to those skilled in the art that it is not so limited, but is susceptible of various other changes and modifications without departing from the spirit thereof.

I claim:

1. The method of forming a product of two different metals in a closed die having a male punch element and a female punch element wherein a first metal member is connected to a second metal member of a smaller size comprising the steps of:

a. providing a recess in one end of said first metal member of a size to receive one end of said second metal member, b. preplating at least one of said metal members with another metal selected from the group consisting of indium and tin, c. placing said first metal member and said second metal member in said closed die with said one end of said second metal member projecting into said recess in said first metal member with the other end of said first metal member being adjacent said male punch element and the other end of said second metal member extending into said female punch element, and d. applying high pressure to the outermost end of at least one of said metal members through at least one of said punch elements to impart relative movement of said metal members toward each other while in said closed die to form a recess in said other end of said first metal member by said male punch element and simultaneously cause flow of the metals together at the point of contact of said metal members with displacement of one metal in the other at said point of contact whereby surface impurities are removed from the interface of the connected portions of said metal members and a metal to metal joint is provided therebetween.

2. The method of forming a product as defined in claim 1 in which said two different metals are aluminum and copper.

3. The method of forming a product as defined in claim 1 in which said two different metals are wrought iron and aluminum.

4. The method of forming a product as defined in claim 1 in which said two different metals are wrought iron and copper.

5. The method of forming a product as defined in claim 1 in which a generally conical bottom is formed in said recess in said one end of said first metal member with the central portion thereof projecting toward the open end of said recess.

6. The method of forming a product as defined in claim 1 in which at least one slit is formed in said one end of said second metal member with said slit opening toward said one end of said second metal member to facilitate spreading of said one end of said second member into said first member as pressure is applied 7. The method of forming a product as defined in claim 1 in which said second metal member is a generally solid member.

8. The method of forming a product as defined in claim 1 in which said second metal member is stranded wire.

* * * * *